US009835754B2

United States Patent
Reiderman et al.

(10) Patent No.: US 9,835,754 B2
(45) Date of Patent: Dec. 5, 2017

(54) SWITCHING AN OPERATING MODE OF AN NMR LOGGING TOOL

(71) Applicant: Halliburton Energy Services, Inc., Houston, TX (US)

(72) Inventors: Arcady Reiderman, Katy, TX (US); Lilong Li, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 541 days.

(21) Appl. No.: 14/418,835

(22) PCT Filed: Dec. 13, 2013

(86) PCT No.: PCT/US2013/074932
§ 371 (c)(1),
(2) Date: Jan. 30, 2015

(87) PCT Pub. No.: WO2015/088551
PCT Pub. Date: Jun. 18, 2015

(65) Prior Publication Data
US 2016/0033670 A1 Feb. 4, 2016

(51) Int. Cl.
*G01V 3/32* (2006.01)
*G01V 3/34* (2006.01)

(52) U.S. Cl.
CPC . *G01V 3/32* (2013.01); *G01V 3/34* (2013.01)

(58) Field of Classification Search
CPC .......... G01V 3/32–3/34; G01R 33/38–33/389; E21B 47/10–47/1025
USPC ........................................ 324/303; 702/6–13
See application file for complete search history.

(56) References Cited

U.S. PATENT DOCUMENTS

| 6,121,773 | A | 9/2000 | Taicher et al. |
| 6,326,784 | B1 | 12/2001 | Ganesan et al. |
| 6,445,180 | B1 | 9/2002 | Reiderman et al. |
| 6,452,388 | B1 | 9/2002 | Reiderman et al. |
| 6,525,535 | B2 | 2/2003 | Reiderman |
| 7,663,363 | B2 | 2/2010 | Reiderman |

(Continued)

FOREIGN PATENT DOCUMENTS

EP 0871045 10/1998

OTHER PUBLICATIONS

International Search Report and Written Opinion of the International Searching Authority issued in International Application No. PCT/US2013/074932 dated Sep. 1, 2014; 18 pages.

(Continued)

*Primary Examiner* — Melissa Koval
*Assistant Examiner* — Rahul Maini
(74) *Attorney, Agent, or Firm* — Benjamin Fite; Parker Justiss, P.C.

(57) ABSTRACT

In some aspects of what is described here, a downhole nuclear magnetic resonance (NMR) logging tool can obtain NMR data from a subterranean region. The NMR logging tool includes a magnet assembly operable to produce a static magnetic field in the subterranean region. The NMR logging tool includes an antenna system having a first radio-frequency (RF) antenna, a second RF antenna, and a switching system. The switching system can switch the second antenna among operating modes while the NMR logging tool is disposed in a borehole in the subterranean region. The operating modes can include a booster mode, a spoiler mode, and an inactive mode.

20 Claims, 8 Drawing Sheets

(56) References Cited

U.S. PATENT DOCUMENTS

| | | | |
|---|---|---|---|
| 8,860,413 B2* | 10/2014 | Hopper | G01V 3/32 324/303 |
| 2004/0046552 A1 | 3/2004 | Taherian et al. | |
| 2010/0277176 A1 | 11/2010 | Homan et al. | |

OTHER PUBLICATIONS

Freedman, "Advances in NMR Logging," Distinguished Author Series, SPE 89177, Jan. 2006, 7 pages.
Halliburton, "MRIL-XL™ Service Delivers Superior NMR Logging," 2008, 2 pages.
Halliburton, "MRIL®-Prime," 2008, 2 pages.
Baker Hughes, "MR eXplorer Magnetic Resonance Logging Service," 2010, 12 pages.

\* cited by examiner

SWITCHING AN OPERATING MODE OF AN NMR LOGGING TOOL

BACKGROUND

Claim of Priority

This application is a U.S. National Stage of International Application No. PCT/US2013/074932, filed Dec. 13, 2013.

This specification relates to downhole tools for acquiring nuclear magnetic resonance (NMR) data from a subterranean region.

In the field of logging (e.g. wireline logging, logging while drilling (LWD) and measurement while drilling (MWD)), nuclear magnetic resonance (NMR) tools have been used to explore the subsurface based on magnetic interactions with subsurface material. Some downhole NMR logging tools include a magnet assembly that produces a static magnetic field, and an antenna assembly that generates radio-frequency (RF) control signals and detects magnetic resonance phenomena in the subsurface material. Properties of the subsurface material can be identified from the detected phenomena.

DETAILED DESCRIPTION

Figure 1A:
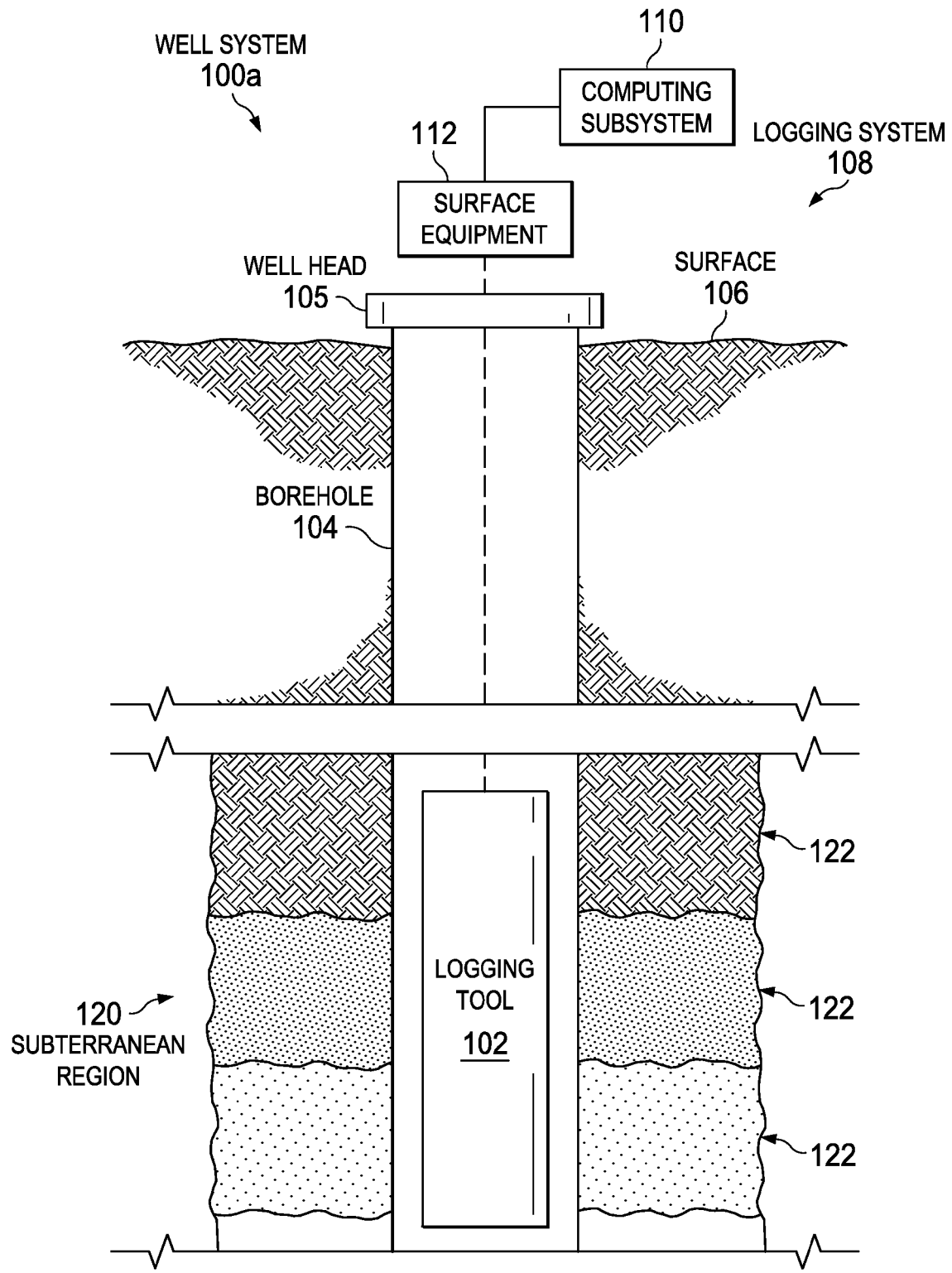
FIG. 1A is a diagram of an example well system.

This specification relates to downhole tools for acquiring nuclear magnetic resonance (NMR) data from a subterranean region. In some implementations, a multi-frequency NMR logging tool has an antenna system that includes a first antenna and a second antenna. The first and second antennas can be connected to each other, or they can be disconnected from each other. In some instances, the antennas can be operated in multiple different modes. When the second antenna is connected as a spoiler, it can operate to reduce signal from part of the sensitive volume about the NMR logging tool (e.g., when part of the sensitive volume lies in the borehole, or in other instances). When the second antenna is connected as a booster, it can operate to increase signal and signal-to-noise ratio by adding part of the sensitive volume about the NMR logging tool. When the second antenna is not connected or when it is connected as a spoiler, the NMR logging tool can operate in a look-aside mode (i.e., collecting NMR data primarily from one side of the NMR logging tool) to eliminate undesired borehole signal. When the second antenna is connected as a booster, the NMR logging tool can operate in a look-around mode (i.e. collecting NMR data in substantially all radial directions).

In some implementations, the NMR logging tool is switchable among these various modes of operation. For example, the NMR logging tool can be changed based on the borehole diameter, the diameter of the sensitive volume, the operating frequency, the bore mud type, the resistivity of fluids in the borehole, or a combination of these and other factors. The operating mode of the NMR logging tool can be changed while the NMR logging tool resides in the borehole. For example, the NMR logging tool can be programmed to acquire NMR data with the second antenna in multiple different operating modes while the NMR logging tool resides at a single logging point, or the NMR logging tool can be programmed to change operating modes for different logging points within different zones of the formation. The NMR logging tool can include an on-board switching system that changes the antenna system during a logging sequence.

In some instances, the ability to change between modes of operation enhances performance or enables additional functionality for an NMR logging tool. For example, a combination of look-aside and look-around modes can provide azimuthally sensitive NMR readings. A comparison of look-aside and look-around data from a given logging point, for example, can indicate the degree of rotational homogeneity (or inhomogeneity) of the subterranean region about the logging point. In some cases, if the subterranean formation surrounding the NMR logging tool is rotationally homogeneous, then the NMR relaxation data for the look-aside mode can be substantially the same as the look-around mode. In some cases, the formation properties are not rotationally symmetric with respect to the well axis, and the look-aside readings and the look-around readings are substantially different. Based on the differences in the NMR data acquired in the various modes of operation, a dip angle or other formation properties related to rotational inhomogeneity could be estimated or computed.

FIG. 1A is a diagram of an example well system 100a. The example well system 100a includes an NMR logging system 108 and a subterranean region 120 beneath the ground surface 106. A well system can include additional or different features that are not shown in FIG. 1A. For example, the well system 100a may include additional drilling system components, wireline logging system components, etc.

The subterranean region 120 can include all or part of one or more subterranean formations or zones. The example subterranean region 120 shown in FIG. 1A includes multiple subsurface layers 122 and a borehole 104 penetrated through the subsurface layers 122. The subsurface layers 122 can include sedimentary layers, rock layers, sand layers, or combinations of these other types of subsurface layers. One or more of the subsurface layers can contain fluids, such as brine, oil, gas, etc. Although the example borehole 104 shown in FIG. 1A is a vertical borehole, the NMR logging system 108 can be implemented in other borehole orientations. For example, the NMR logging system 108 may operate in horizontal boreholes, slant boreholes, curved boreholes, vertical boreholes, or combinations of these.

The example NMR logging system 108 includes a downhole NMR logging tool 102, surface equipment 112, and a computing subsystem 110. In the example shown in FIG. 1A, the NMR logging tool 102 is a downhole logging tool that operates while disposed in the borehole 104. The example surface equipment 112 shown in FIG. 1A operates at or above the surface 106, for example, near the well head 105, to control the NMR logging tool 102 and possibly other downhole equipment or other components of the well system 100*a*. The example computing subsystem 110 can receive and analyze logging data from the NMR logging tool 102. An NMR logging system can include additional or different features, and the features of an NMR logging system can be arranged and operated as represented in FIG. 1A or in another manner.

In some instances, all or part of the computing subsystem 110 can be implemented as a component of, or can be integrated with one or more components of, the surface equipment 112, the NMR logging tool 102 or both. In some cases, the computing subsystem 110 can be implemented as one or more discrete computing systems that are separate from the surface equipment 112 and the NMR logging tool 102.

In some implementations, the computing subsystem 110 is embedded in the NMR logging tool 102, and the computing subsystem 110 and the NMR logging tool 102 can operate concurrently while disposed in the borehole 104. For example, although the computing subsystem 110 is shown above the surface 106 in the example shown in FIG. 1A, all or part of the computing subsystem 110 may reside below the surface 106, for example, at or near the location of the NMR logging tool 102.

The well system 100*a* can include communication or telemetry equipment that allows communication among the computing subsystem 110, the NMR logging tool 102, and other components of the NMR logging system 108. For example, the components of the NMR logging system 108 can each include one or more transceivers or similar apparatus for wired or wireless data communication among the various components. The NMR logging system 108 can include systems and apparatus for wireline telemetry, wired pipe telemetry, mud pulse telemetry, acoustic telemetry, electromagnetic telemetry, or a combination of these and other types of telemetry. In some cases, the NMR logging tool 102 receives commands, status signals, or other types of information from the computing subsystem 110 or another source. In some cases, the computing subsystem 110 receives logging data, status signals, or other types of information from the NMR logging tool 102 or another source.

NMR logging operations can be performed in connection with various types of downhole operations at various stages in the lifetime of a well system. Structural attributes and components of the surface equipment 112 and NMR logging tool 102 can be adapted for various types of NMR logging operations. For example, NMR logging may be performed during drilling operations, during wireline logging operations, or in other contexts. As such, the surface equipment 112 and the NMR logging tool 102 may include, or may operate in connection with drilling equipment, wireline logging equipment, or other equipment for other types of operations.

Figure 1B:
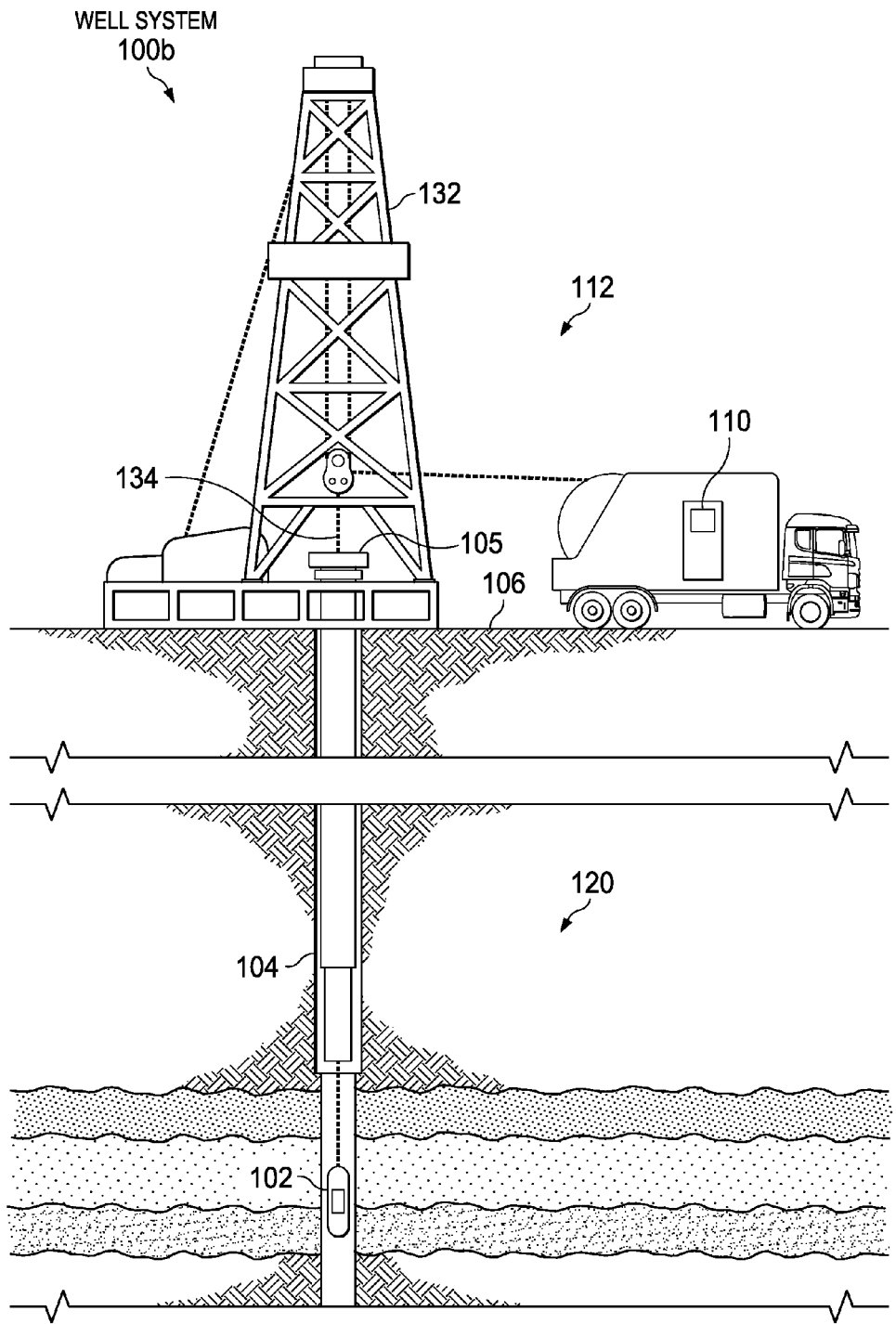
FIG. 1B is a diagram of an example well system that includes an NMR logging tool in a wireline logging environment.

In some examples, NMR logging is performed during wireline logging operations. FIG. 1B shows an example well system 100*b* that includes the NMR logging tool 102 in a wireline logging environment. In some example wireline logging operations, the surface equipment 112 includes a platform above the surface 106 equipped with a derrick 132 that supports a wireline cable 134 that extends into the borehole 104. Wireline logging operations can be performed, for example, after a drilling string is removed from the borehole 104, to allow the wireline NMR logging tool 102 to be lowered by wireline or logging cable into the borehole 104.

Figure 1C:
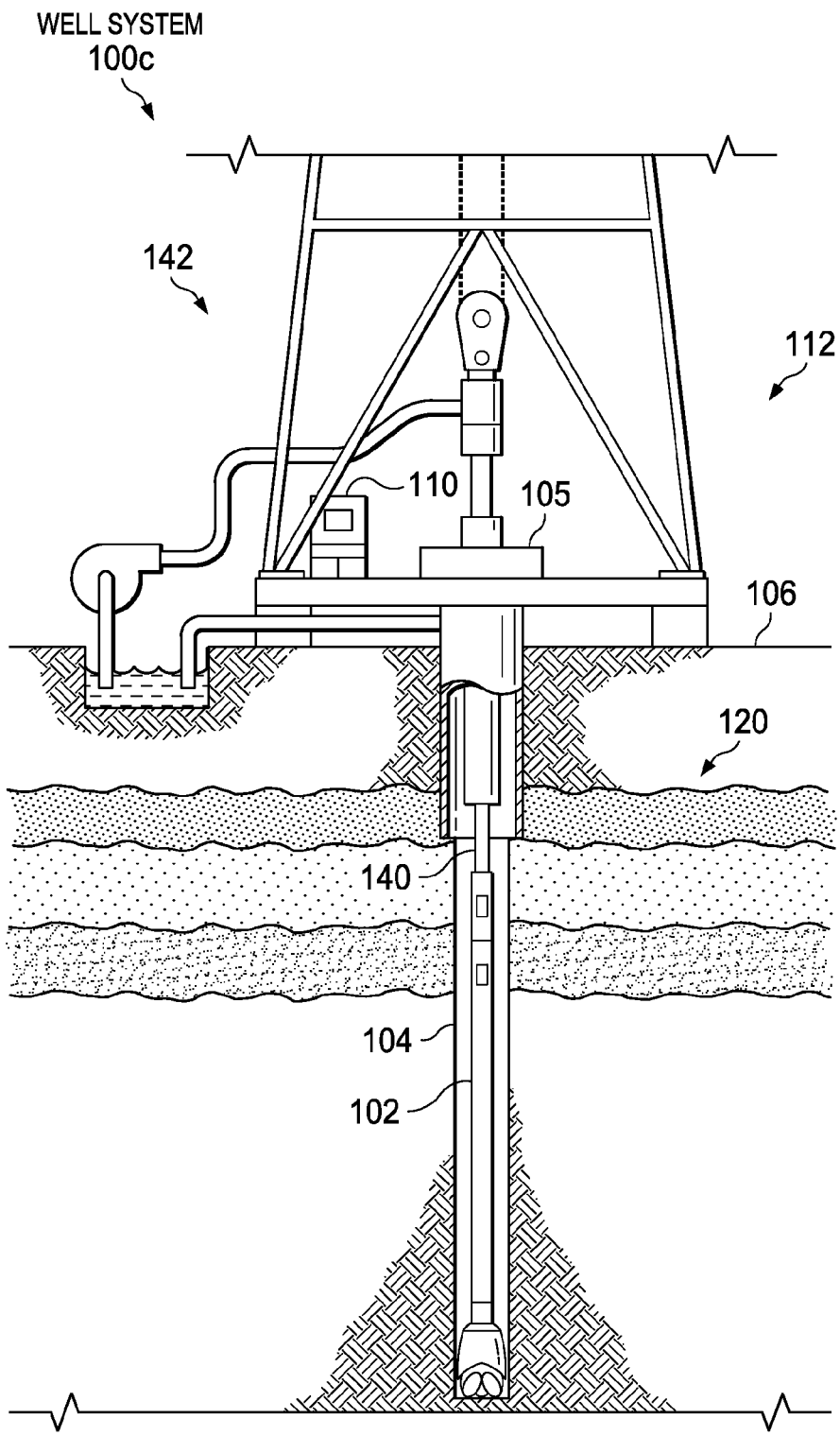
FIG. 1C is a diagram of an example well system that includes an NMR logging tool in a logging while drilling (LWD) environment.

In some examples, NMR logging is performed during drilling operations. FIG. 1C shows an example well system 100*c* that includes the NMR logging tool 102 in a logging while drilling (LWD) environment. Drilling is commonly carried out using a string of drill pipes connected together to form a drill string 140 that is lowered through a rotary table into the borehole 104. In some cases, a drilling rig 142 at the surface 106 supports the drill string 140, as the drill string 140 is operated to drill a borehole penetrating the subterranean region 120. The drill string 140 may include, for example, a kelly, drill pipe, a bottom hole assembly, and other components. The bottom hole assembly on the drill string may include drill collars, drill bits, the NMR logging tool 102, and other components. The logging tools may include measuring while drilling (MWD) tools, LWD tools, and others.

In some instances of operation, the NMR logging tool 102 obtains NMR measurements from the subterranean region 120. As shown, for example, in FIG. 1B, the NMR logging tool 102 can be suspended in the borehole 104 by a coiled tubing, wireline cable, or another structure that connects the tool to a surface control unit or other components of the surface equipment 112. In some example implementations, the NMR logging tool 102 is lowered to the bottom of a region of interest and subsequently pulled upward (e.g., at a substantially constant speed) through the region of interest. As shown, for example, in FIG. 1C, the NMR logging tool 102 can be deployed in the borehole 104 on jointed drill pipe, hard wired drill pipe, or other deployment hardware. In some example implementations, the NMR logging tool 102 collects data during drilling operations as it moves downward through the region of interest. In some instances, the NMR logging tool 102 collects data while the drilling string 140 is moving, for example, while it is being tripped in or tripped out of the borehole 104.

In some implementations, the NMR logging tool 102 collects data at discrete logging points in the borehole 104. For example, the NMR logging tool 102 can move upward or downward incrementally to each logging point at a series of depths in the borehole 104. At each logging point, instruments in the NMR logging tool 102 perform measurements on the subterranean region 120. The measurement data can be communicated to the computing subsystem 110 for storage, processing, and analysis. Such data may be gathered and analyzed during drilling operations (e.g., during logging while drilling (LWD) operations), during wireline logging operations, or during other types of activities.

The computing subsystem 110 can receive and analyze the measurement data from the NMR logging tool 102 to detect properties of various subsurface layers 122. For example, the computing subsystem 110 can identify the density, fluid content, or other properties of the subsurface layers 122 based on the NMR measurements acquired by the NMR logging tool 102 in the borehole 104.

In some implementations, the NMR logging tool 102 obtains NMR signals by polarizing nuclear spins in the subterranean region 120 and pulsing the nuclei with a radio-frequency (RF) magnetic field. Various pulse sequences (i.e., series of RF pulses) can be used to obtain NMR signals, including the Carr Purcell Meiboom Gill (CPMG) sequence (in which the spins are first tipped using a tipping pulse followed by a series of refocusing pulses), the Optimized Refocusing Pulse Sequence (ORPS) in which the tipping pulse is less than 90° and the refocusing pulses are less than 180°, and other pulse sequences. The acquired spin-echo signals may be inverted to a relaxation-time distribution (e.g., a distribution of a transverse relaxation times $T_2$ or a longitudinal relaxation time $T_1$). The relaxation-time distribution can be used to determine various physical properties of the formation by solving one or more inverse problems.

In some implementations, the NMR logging tool 102 can be operated in multiple different operating modes while disposed in the borehole 104. For example, the NMR logging tool 102 may be changeable between a look-aside mode and a look-around mode of operation. In the look-aside mode, the NMR logging tool 102 is more sensitive to NMR excitation on one side of the tool and less sensitive to NMR excitation on the other side. The more sensitive side of the tool is typically pressed against the inner wall of the borehole. For example, the NMR logging tool may be shifted from the radial center of the borehole, thereby providing a greater depth of investigation in the direction of sensitivity. The look-aside mode of operation may be useful, for example, for larger diameter boreholes or in other instances.

In the look-around mode of operation, the NMR logging tool 102 is typically sensitive to NMR excitation in all radial directions about the tool. For example, the NMR logging tool 102 may have an oval-shaped or circular-shaped region of sensitivity. The look-around mode of operation may be useful, for example, in smaller diameter boreholes and in other instances. The NMR logging tool in the look-around mode can be operated at the radial center of the borehole, or at a radially-shifted position within the borehole (e.g., pressed against the inner wall of the borehole).

In some implementations, the NMR logging tool 102 includes an antenna system that is changeable among different operating modes. For example, the antenna system may include a switching system that switches the antenna system between the look-aside mode and the look-around mode, or between different configurations of the look-aside mode.

In some cases the NMR logging tool 102 changes between different operating modes while disposed in the borehole 104. For example, the NMR logging tool 102 may change between the look-aside mode and the look-around mode while disposed at a single logging point. The NMR logging tool 102 may acquire NMR logging data from a single logging point in both the look-aside mode and the look-around mode, or the NMR logging tool 102 may acquire NMR logging data from a first series of logging points in the look-aside mode, and from a second series of logging points in the look-around mode.

In some cases, the antenna system of the NMR logging tool 102 is changed between different configurations in the look-aside mode of operation. For example, the look-aside mode can operate with or without a spoiler. The spoiler can be used, for example, to suppress NMR signal from the less-sensitive side of the logging tool. In some cases, the look-aside mode operates without the spoiler and the NMR signal from the less-sensitive side of the tool is not actively suppressed.

A number of factors may be considered when determining the mode of operation of the NMR logging tool 102 for a given logging point in the borehole 104. For example, the diameter of the borehole, the depth of investigation, the frequency of operation, the type of fluid in the borehole 104, or a combination of these and other factors may be considered. In some cases, the NMR logging tool 102 is a multi-frequency tool. In other words, the NMR logging tool 102 may operate at multiple distinct radio frequencies over a range, and each RF may correspond to a different depth of investigation about the borehole 104.

Generally, lower frequencies correspond to a larger depth of investigation, while higher frequencies correspond to smaller depth of investigation. The look-around mode of operation may be useful, for example, at lower frequencies when the depth of investigation extends far beyond all sides of the borehole 104. The look-aside mode may be useful, for example, at higher frequencies when the depth of investigation does not extend a substantial distance beyond the borehole wall in one or more radial directions.

The look-around mode of operation may also be useful, for example, to gain signal-to-noise ratio when the borehole is filled with oil-based drilling mud or another type of oil-based fluid. Oil-based fluids are generally nonconductive and lead to less NMR signal loss (compared, for example, with water-based fluids). Water-based fluids (e.g., water-based drilling muds, brine, etc.) are generally conductive and lead to a lower signal-to-noise ratio. As such, the look-aside mode of operation may be useful when the borehole 104 is filled with water-based fluids, for example, to reduce the amount of energy loss and signal-to-noise ratio loss due to the water-based fluids in the borehole.

In addition, the look-around mode of operation may be useful to increase signal-to-noise ratio in smaller boreholes (e.g., an 8-inch diameter borehole) when the sensitive region detected by the NMR logging tool 102 extends beyond the borehole wall in all directions. The look-aside mode of operation may be useful in larger boreholes (e.g., a 14-inch diameter borehole) when the sensitive region detected by the NMR logging tool 102 does not extend beyond the borehole wall in one or more radial directions.

It may be useful to change the operating mode of the NMR logging tool 102 while the NMR logging tool 102 is disposed in the borehole 104 (e.g., at a single logging point or between different logging points). For example, the operating frequency of the NMR logging tool 102, the fluid content of the borehole 104, and other factors may change while the NMR logging tool 102 is disposed in the borehole 104. Moreover, it may be useful to compare data collected in different modes of operation even when the operating environment remains unchanged.

In some instances, the NMR logging tool 102 can be changed between the look-around mode and the look-aside mode for a comparison of the NMR data obtained in each mode. In some examples, the NMR logging tool 102 can be changed between the look-aside mode with the spoiler active and the look-aside mode with the spoiler inactive (e.g., for different depths of investigation at a single logging point in the borehole 104). For instance, the spoiler may be deactivated to increase the signal for larger depths of investigation (i.e., lower frequency), and the spoiler may be activated to cancel signal from water-based mud for smaller depths of investigation (i.e., higher frequency).

In some cases, the NMR logging tool 102 can include an antenna system having a primary antenna and a secondary antenna, and the magnetic field generated by the two antennas can be varied by switching the direction of the current on one of the coils such that the coils work additively together or against each other. The magnetic field generated by the two antennas can be varied deactivating or activating one of the coils. In some instances, the direction of the current in the secondary coil determines the shape of the sensitive region of the NMR logging tool 102. For example, the secondary coil may be operated in a booster mode in which the NMR logging tool is sensitive in all radial directions, or the secondary coil may be operated in the spoiler mode in which the NMR logging tool 102 is substantially more sensitive in one radial direction than in the opposite radial direction.

In some cases, the NMR logging tool 102 can be adapted for boreholes of different diameters. As one example, the operating mode of some example NMR logging tools can be changed depending on the borehole size: the tool can operate in the look-around mode in smaller boreholes (e.g., approximately seven-inch diameter or smaller), the tool can switch between look-around and look-aside modes in medium boreholes (e.g., from approximately eight-inch to twelve-inch diameter), or the tool can operate in a look-aside mode in larger boreholes (e.g., approximately twelve-inch diameter or larger). The operating mode of the NMR logging tool 102 can account for the borehole size in another manner.

Figure 2A:
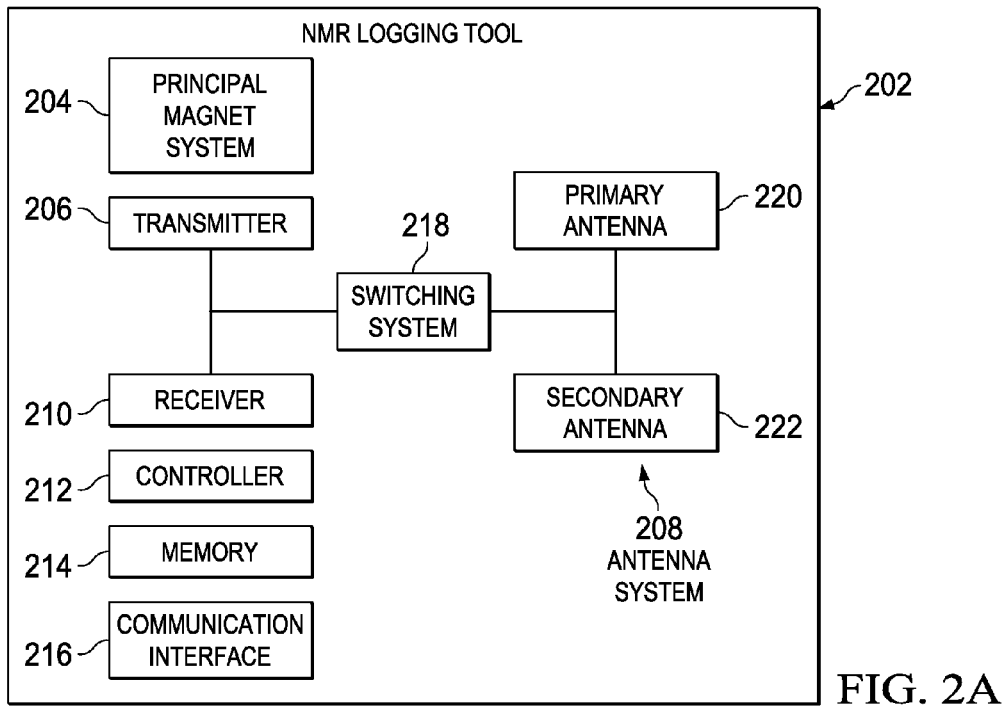
FIG. 2A is a diagram of an example NMR logging tool.

FIG. 2A is a diagram of an example NMR logging tool 202. The NMR logging tool 202 can be operated as the example NMR logging tool 102 shown in FIGS. 1A, 1B, and 1C, or the NMR logging tool 202 may be operated in another manner. In some instances, the NMR logging tool 202 may be operated according to the example process 250 shown in FIG. 2B, or the NMR logging tool 202 may be operated in another manner.

The example NMR logging tool shown in FIG. 2A includes a principal magnet system 204, a transmitter 206, an antenna system 208, a receiver 210, a controller 212, a memory 214, and a communication interface 216. The NMR logging tool 202 may include additional or different features (e.g., a gradient system, etc.), and the features of the NMR logging tool 202 may be configured as shown in FIG. 2A or in another manner. In some instances, the example NMR logging tool 202 may include the features shown and described with respect to FIGS. 3, 4A, 4B, and 5. In some instances, the NMR logging tool is included in a drill string and operated in a drilling context while disposed in a borehole in a subterranean formation. In some instances, the NMR logging tool 202 is operated in a wireline logging context while supported in a borehole by a wireline system. The NMR logging tool 202 may be operated in other contexts and for other purposes.

The example principal magnet system 204 can include multiple permanent magnets adapted to create a magnetic field about the NMR logging tool 202. The principal magnet system 204 can produce a static magnetic field that is designed to polarize nuclear spins in a volume of a subterranean formation about the borehole. In some instances, the static magnetic field generated by the principal magnet system 204 is substantially uniform over a region of interest, but in some instances, the static magnetic field need not be uniform.

The example transmitter 206 can generate and send an RF drive signal to the antenna system 208. The transmitter 206 can receive input data from the controller 212, the memory 214, or another source. In some cases, the RF drive signal generated by the transmitter 206 includes a pulse sequence applied by the antenna system 208.

The example antenna system 208 can receive the RF drive signal from the transmitter 206 and generate an RF magnetic field about the NMR logging tool 202. The RF magnetic field generated by the antenna system 208 can be, for example, an RF pulse that manipulates the direction of polarization of nuclear spins in the region of interest about the borehole. The antenna system 208 can receive a current from the transmitter 206 and produce an RF dipole field based on the current. When collecting NMR data, the antenna system 208 magnetically couples with the nuclear spins in the subterranean region, which produces an RF detection signal on the antennas. The antenna system 208 can output the detection signal to the receiver 210.

The example receiver 210 can receive the RF detection signal from the antenna system 208. The receiver 210 can provide the received RF detection signal to the controller 212, the memory 214, the communication interface 216, or to another location. In some cases, the receiver 210 can digitize or preprocess the RF detection signal from the antenna system 208.

The example controller 212 can control operation of the logging tool 202. For example, the controller 212 can control the transmitter 206 and the receiver 210 to control pulse sequences applied by the antenna system 208, and to control the detection of NMR signals by the antenna system 208. The controller 212 can be, for example, a digital electronic controller, a programmable microprocessor, or any other type of data processing apparatus.

The example memory 214 can include any type of data storage, computer memory, or another type of computer-readable medium. In some cases, the memory 214 can store machine-readable instructions that are executed by the controller 212 to operate the NMR logging tool 202. In some instances, the memory 214 can store a pulse program that specifies one or more pulse sequences to be applied by the antenna system 208. The memory 214 may store NMR data acquired by the NMR logging tool 202. For example, the memory 214 may store NMR logging data obtained from a subterranean region. The memory 214 may store additional or different types of data.

The example communication interface 216 allows the NMR logging tool 202 to interface with other tools, systems, or communication links. In some cases, the communication interface 216 includes a data port that allows pulse sequences to be loaded into the memory 214 or programmed into the controller 212. In some cases, the communication interface 216 includes a data port that allows NMR logging data to be communicated from the NMR logging tool 202 to an external computing system or database. In some instances, the communication interface 216 transmits NMR logging data from the NMR logging tool 202 while the NMR logging tool 202 is disposed within a borehole in a subterranean formation. For example the NMR logging data may be transmitted to a computing system or another destination at the surface.

The example antenna system 208 shown in FIG. 2A includes a switching system 218, a primary antenna 220, and a secondary antenna 222. The antenna system 208 may include additional or different features, and the features of the antenna system 208 can be arranged as shown in FIG. 2A or in another manner. The primary and secondary antennas can be structurally identical, or different antenna structures can be used. In some instances, the antenna system 208 includes more than two antennas.

In the example shown in FIG. 2A, the secondary antenna 222 is switchable among multiple different operating modes. In some implementations, the operating modes for the secondary antenna 222 include a booster mode, a spoiler mode, and an inactive mode. The switching system 218 can switch the secondary antenna 222 among the different operating modes while the NMR logging tool 202 is disposed in the borehole. For example, the controller 212 can manipulate the switching system 218 to reverse polarity of the secondary antenna 222 with respect to the primary antenna 220, or to activate the secondary antenna 222, or to deactivate the secondary antenna 222. In some cases, the controller 212 manipulates the switching system 218 based on a logging sequence or other instructions stored in the memory 214. In some cases, the controller 212 manipulates the switching system 218 in response to instructions received by the communication interface 216 (e.g., control signals received from the surface) while the NMR logging tool 202 is disposed in the borehole.

Figure 5:
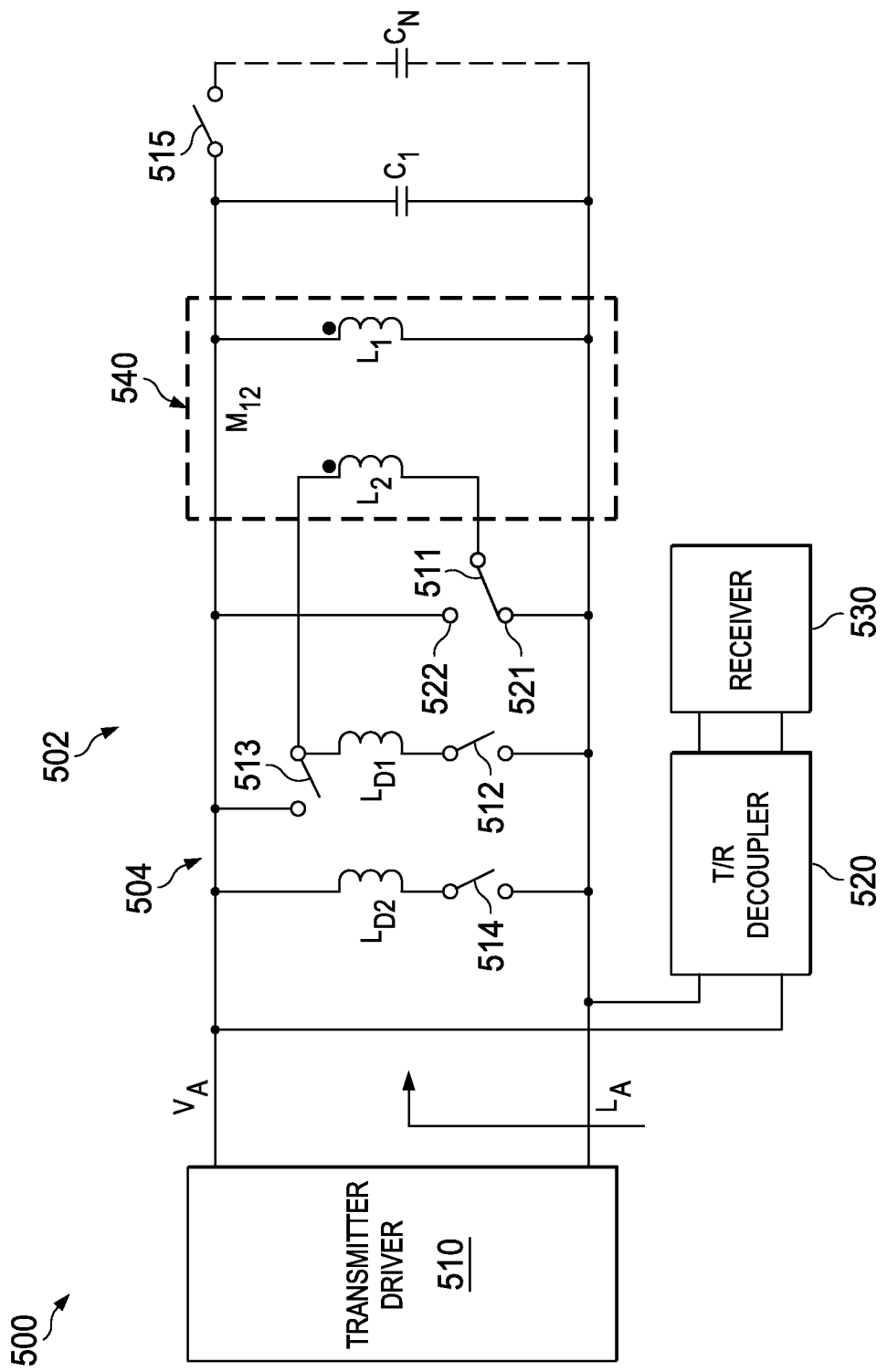
FIG. 5 is a diagram showing example electronic circuitry for an NMR logging tool.

The switching system 218 can be the example switching system shown in FIG. 5, or another type of switching system can be used. The switching system 218 can control the mode of operation of the NMR logging tool 202 by selecting the operating mode of one or more antennas of the antenna system 208. For example, the switching system 218 may change the secondary antenna 222 to a booster mode to change the NMR logging tool 202 to the look-around mode; or the switching system 218 may change the secondary antenna 222 to a spoiler mode or an active mode to operate the NMR logging tool 202 in the look-aside mode.

In the example shown in FIG. 2A, the primary antenna 220 and the secondary antenna 222 are both configured to produce respective RF magnetic dipole fields. The orientation of the dipole field generated by the secondary antenna 222 with respect to the orientation of the dipole field generated by the primary antenna 220 depends on whether the NMR logging tool 202 is operated in the spoiler mode or the booster mode. In some instances, the secondary antenna 222 is in an inactive mode and produces substantially no RF magnetic field (e.g., even while the primary antenna 220 produces an RF magnetic dipole field).

In some implementations, when operated in the booster mode during the transmission portion of the pulse sequence, the magnetic field of the secondary antenna 222 shares the same orientation as that of the primary antenna 220, with both fields being substantially parallel. The fields can combine to form an RF magnetic field that matches one of the isolines of the static magnetic field generated by the principal magnet system 204. During the receiving portion of the pulse sequence, both of the antennas can receive signals from the subterranean region. As such, both the primary antenna 220 and the secondary antenna 222 may operate during both transmission and receiving portions of the pulse sequence.

In some implementations, when operated in the spoiler mode, the secondary antenna 222 operates only during the transmission portion of the pulse sequence and can either operate or be inactive during the receiving portion of the pulse sequence. In the spoiler mode of operation, the secondary antenna 222 generates a magnetic field that opposes and is anti-parallel to that of the primary antenna 220. The magnetic field generated by the secondary antenna 222 may cause a magnetic field on the backside of the NMR logging tool 202 to substantially vanish, without suppressing the magnetic field on the front side of NMR logging tool 202. In this manner, the NMR logging tool 202 can be used as a side-looking NMR device.

In some implementations, when operated in the inactive mode, the secondary antenna 222 is inactive during both the transmission portion and the receiving portion of the pulse sequence applied by the antenna system 208. As such, the secondary antenna 222 does not suppress the magnetic field on the backside of the tool in such instances. In the look-aside mode of operation without an active spoiler, the NMR logging tool 202 generates a sensitive region on the front side of the NMR logging tool by virtue of the primary antenna 220 being disposed closer to the front side of the NMR logging tool than the back side. As such, the primary antenna 220 operating without the secondary antenna 222 can generate a sensitive region on the front side of the NMR logging tool 202 without necessarily requiring operation of the spoiler antenna.

In some cases, the example switching system 218 is switchable between at least three configurations in the example shown in FIG. 2A. When the switching system 218 is in a spoiler configuration, the primary antenna 220 and the secondary antenna 222 are active and configured to produce respective RF magnetic dipole fields having opposite orientations. In other words, the magnetic dipole fields produced by the primary and secondary antennas are anti-parallel and generally aligned on a common axis. When the switching system 218 is in a booster configuration, the primary antenna 220 and the secondary antenna 222 are active and configured to produce respective RF magnetic dipole fields having a common orientation. In other words, the magnetic dipole fields produced of the primary and secondary antennas are parallel and generally aligned on a common axis. When the switching system 218 is in a no-spoiler configuration, the primary antenna 220 is active and configured to produce an RF magnetic dipole field, and the secondary antenna 222 is inactive. In other words, the secondary antenna 222 is configured to not produce a magnetic field to any significant degree. The switching system 218 may control additional antennas, and the switching system 218 may control the antennas in a different manner.

Figure 2B:
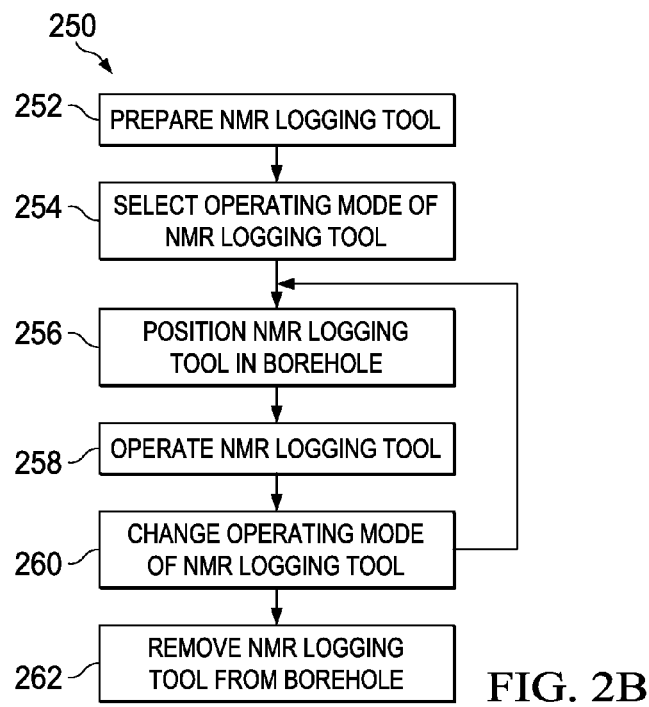
FIG. 2B is a flow chart showing an example process for operating an NMR logging tool.

FIG. 2B is a flowchart showing an example process 250 for operating an NMR logging tool. The example process 250 can be used to operate the example NMR logging tool 102 shown in FIG. 1, the example NMR logging tool 202 shown in FIG. 2, or another type of NMR logging tool. The example process 250 can be used in a logging while drilling context, in a wireline logging context, or in another context. The example process 250 can include additional or different operations, and the operations of the example process 250 can be performed in the order shown or another order. In some cases, one or more operations in the example process 250 can be repeated or iterated, for example, until a terminating condition is reached. In some instances, one or more of the operations can be performed concurrently, in parallel, in series, or in another manner.

At 252, the NMR logging tool is prepared for logging operations. For example, the NMR logging tool can be prepared for logging operations before the NMR logging tool enters the borehole. Preparing the NMR logging tool for operation may include, for example, programming the NMR logging tool to perform a logging sequence, storing one or more pulse sequences on the NMR logging tool, or other types of operations. In some instances, preparing the NMR logging tool for operation includes pre-selecting one or more operating modes for the NMR logging tool. For example, the NMR logging tool can be programmed to operate in a look-aside mode, a look-around mode, or another mode at one or more locations in the borehole. As another example, the NMR logging tool can be programmed to operate one or more antennas of the antenna system in a booster mode, spoiler mode, or an inactive mode at one or more locations in the borehole.

Before or after the NMR logging tool is prepared for logging operations, the NMR logging tool is lowered into a borehole defined in a subterranean region. For example, the NMR logging tool can be run into the borehole on a wireline logging assembly, or the NMR logging tool can be carried on a drill string as the drilling assembly operates to drill the borehole in the subterranean region.

At 254, an operating mode of the NMR logging tool is selected. The operating mode of the NMR logging tool can be, for example, the look-aside mode in which the NMR logging tool is adapted to detect a substantially higher proportion of NMR signal from a first radial direction than a second, opposite radial direction. In the look-aside mode, the NMR logging tool can define a sensitive region on one side of the borehole, while being less sensitive or insensitive to the opposite side of the borehole. The operating mode of the NMR logging tool can be, for example, the look-around mode in which the NMR logging tool is adapted to detect NMR signals from substantially all radial directions about the NMR logging tool. For example, the NMR logging tool can be configured to detect an equal proportion of NMR signal from both the front and back sides of the NMR logging tool.

In some instances, selecting the operating mode of the NMR logging tool includes configuring a switching system of the NMR logging tool to particular configuration. For example, the switching system can be configured to activate the secondary antenna of the NMR logging tool in a spoiler mode or a booster mode. As another example, the switching system can be configured to deactivate the secondary antenna of the NMR logging tool, making the secondary antenna inactive.

At 256, the NMR logging tool is positioned in the borehole. Positioning the NMR logging tool in the borehole may include selecting a depth of the NMR logging tool. For example, the NMR logging tool may be operated at an array of discrete logging points along the depth of the borehole, or the NMR logging tool may be operated over a continuous range of logging points along the depth of the borehole.

In some instances, positioning the NMR logging tool in the borehole includes selecting a radial position of the NMR logging tool. For example, the NMR logging tool may be positioned at a radial center of the borehole to acquire NMR logging signals from all directions about the borehole (in the look-around mode). As another example, the NMR logging tool may be positioned at a radially shifted position within the borehole. In the radially shifted position, the NMR logging tool may abut the sidewall of the borehole, or the front of the NMR logging tool may be substantially closer to one side of the borehole than the opposite side. For example, the long axis of the NMR logging tool may be parallel to the long axis of the borehole but radially shifted toward one of the side walls of the borehole. The NMR logging tool may operate in the look-aside mode, the look-around mode, or another mode of operation in the radially-shifted position.

At 258, the NMR logging tool is operated within the borehole. Generally, operating the NMR logging tool may include generating RF magnetic fields, acquiring RF signals, or other types of NMR logging tool operations. In some cases, an RF magnetic field is generated by operation of the antenna system of the NMR logging tool while the secondary antenna of the NMR logging tool is in the selected operating mode (e.g., spoiler mode, booster mode, inactive mode, etc.). In some instances, after the RF magnetic field is generated by the antenna system, the antenna system is operated in a receive mode to acquire NMR logging signals from the subterranean region.

At 260, the operating mode of the NMR logging tool is changed. For example, the NMR logging tool may be changed between a look-aside mode and a look-around mode of operation. As another example, the antenna system of the NMR logging tool may be changed between a spoiler mode and a booster mode, or an active mode and an inactive mode. The operating mode of the NMR logging tool can be changed while the NMR logging tool resides in the borehole.

The operating mode of the NMR logging tool can be changed in a number of instances while the NMR logging tool resides in the borehole. For example, the NMR logging tool may be changed between the look-aside mode and the look-around mode so that NMR data acquired in the two modes can be compared, for example, to detect asymmetry about the borehole. As another example, the NMR logging tool may operate at multiple different frequencies at the same logging point or a different logging point in the borehole. In such instances, the spoiler and no-spoiler look-aside modes of operation may be useful for different operating frequencies. In some cases, the spoiler mode is useful for higher frequencies and smaller depth of investigation, while the no-spoiler mode is useful for lower frequencies and higher depth of investigation. The operating mode of the NMR logging tool may be changed for these and other reasons.

In some instances, changing the operating mode of the NMR logging tool includes changing the secondary antenna of the NMR logging tool from the booster mode to the inactive mode or from the inactive mode to the booster mode. In some instances, changing the operating mode of the NMR logging tool includes changing the secondary antenna of the NMR logging tool from the booster mode to the spoiler mode or from the spoiler mode to the booster mode. In some instances, changing the operating mode of the NMR logging tool includes changing the secondary antenna of the NMR logging tool from the inactive mode to the spoiler mode or from the spoiler mode to the inactive mode. In some cases, changing the NMR logging tool to a different mode of operation includes manipulating one or more switches on a switching system of the NMR logging tool. For example, one or more of the example switches shown in FIG. 5 can be changed to select the operating mode of the NMR logging tool.

In some implementations, the operating frequency of the NMR logging tool is changed when the secondary antenna is changed. For example, the operating frequency can be increased for a shallower depth of investigation or decreased for a deeper depth of investigation. In some instances, when changing to a deeper depth of investigation, the secondary antenna can be changed to the booster mode; or when changing to a shallower depth of investigation, the secondary antenna can be changed to the spoiler or inactive (no-spoiler) mode.

As shown in FIG. 2B, the example process 250 can return to 256 to reposition the NMR logging tool in the borehole after changing the mode of operation at 260. For example, the NMR logging tool can be repositioned at the same logging point. For instance, if the NMR logging tool is changed from the look-around mode to the look-aside mode, the NMR logging tool can be repositioned from a radial center of the borehole to a radial side of the borehole adjacent to the borehole wall; or if the NMR logging tool is changed from the look-aside mode to the look-around mode, the NMR logging tool can be repositioned toward the radial center of the borehole away from the borehole wall. As another example, the NMR logging tool can be repositioned at another logging point. For instance, the NMR logging tool can be moved to a different depth in the wellbore, which may correspond to a different layer of the subterranean formation.

In some instances, the NMR logging tool is not repositioned after the operating mode of the NMR logging tool is changed at 260. For example, the NMR logging tool can be changed from a spoiler mode in the look-aside mode of operation to a no-spoiler mode in the look-aside mode of operation. As another example, the NMR logging tool can be changed from operating in the look-aside mode to operating in the look-around mode at the same radial location in the wellbore. In such instances, the NMR logging tool can change its mode of operation multiple times at the same logging point and at the same radial position within the borehole.

As shown in FIG. 2B, after the operating mode of the NMR logging tool is changed (at 260) and possibly repositioned (at 256), the NMR logging tool is operated (at 258) in the new operating mode. For example, the NMR logging tool may generate a radio-frequency magnetic field having distinct properties on each iteration of operating the NMR logging tool at 258. In some cases, the NMR logging tool is operated at a different frequency on each iteration, or with the secondary antenna in a different operating mode.

In some cases, the operations 256, 258, and 260 are repeated for a logging sequence at multiple different logging positions or at a single logging position within the borehole. On each iteration, an RF pulse sequence can be applied to a different region of interest or to the same region of interest, and an NMR signal can be acquired from the region of interest. The NMR logging signals acquired by operating the NMR logging tool can be stored locally on the NMR logging tool, transmitted to a remote location, preprocessed, or handled in a different manner.

At 262, the NMR logging tool is removed from the borehole. For example, the NMR logging tool can be removed by wireline logging equipment, by tripping a drill string out of the borehole, or in another manner The NMR logging data acquired by the NMR logging tool during the example process 250 can be used to analyze the subterranean region. For example, the NMR logging data can be used to determine the porosity, fluid type, permeability, viscosity, or other properties of the subterranean formation or fluids resident in the subterranean formation. In some cases, the NMR logging data is used as an input for a steering algorithm that controls the direction and operation of a drill string. For example, the NMR logging data can be used to detect boundaries of a subterranean layer, or other information that can be used as an input for steering a drilling system.

Figure 3:
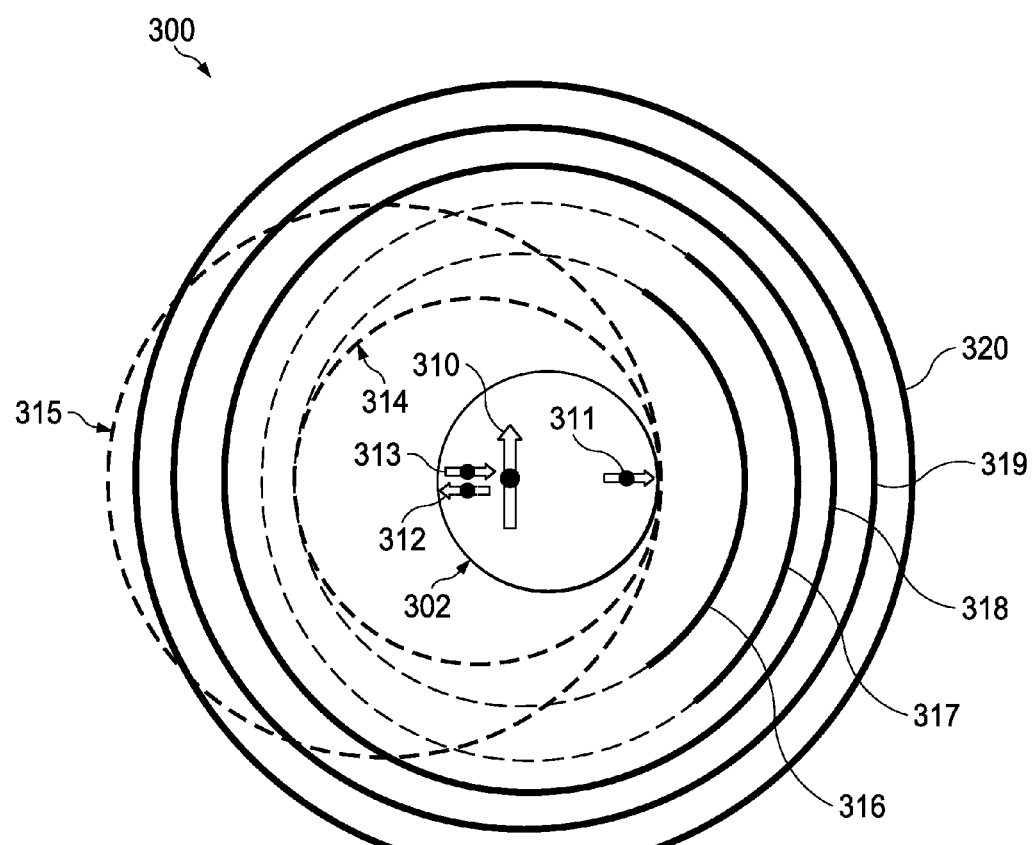
FIG. 3 is a diagram of an example NMR logging tool in a subterranean region.

FIG. 3 is a diagram of an example NMR logging tool 302 in a subterranean region 300. The example NMR logging tool 302 is shown in FIG. 3 in a simplified cross-sectional view for illustration purposes. FIG. 3 shows two alternative borehole sizes in the subterranean region 300. In particular, a smaller borehole 314 and a larger borehole 315 are both shown in the same view for comparison.

FIG. 3 also shows examples of sensitive volumes for different operating frequencies of the NMR logging tool 302. In the example shown, the smaller borehole 314 is an 8.5-inch diameter borehole, and the larger borehole 315 is a 12.5-inch diameter borehole. The cross-sections of the cylindrical sensitive volumes 316, 317, 318, 319 and 320 relate to five different operating frequencies, with the sensitive volume 316 corresponding to the highest operating frequency.

FIG. 3 shows multiple example magnetic dipole fields that can be generated by the principal magnet system and the antenna system of the NMR logging tool 302. The static magnetic dipole field 310 can be generated by a principal magnet system. The radio-frequency (RF) magnetic dipole fields 311, 312, and 313 can be generated by an antenna system of the NMR logging tool. The antenna system can include a first antenna, a second antenna, a switching system that switches the antennas between different modes of operation, and other features. The number of RF magnetic dipole fields and the spatial alignment between them can depend on the configuration of the switching system.

The first RF magnetic dipole field 311 can be generated by a primary antenna. In some instances, the secondary antenna is in an inactive mode, and does not generate a magnetic field (e.g., even when the primary antenna generates the RF magnetic dipole field 311). In some instances, the secondary antenna operates in a booster mode and generates the RF magnetic dipole field 313. As shown in FIG. 3, the RF magnetic dipole field 313 generated by the secondary antenna in the booster mode is aligned with, and parallel to, the RF magnetic dipole field 311 generated by the primary antenna (i.e., the two dipoles point in the same direction). In some instances, the secondary antenna is in a spoiler mode and generates the RF magnetic dipole field 312. As shown in FIG. 3, the RF magnetic dipole field 312 generated by the secondary antenna in the spoiler mode is aligned with and anti-parallel to the RF magnetic dipole field 311 generated by the primary antenna (i.e., the two dipoles point in opposite directions). Both antennas may operate in a transmit mode (to generate an RF magnetic field) and a receive mode (to receive NMR signals).

FIG. 3 illustrates an example situation where none of the excitation volumes has a part that lies in the smaller borehole 314. In the example shown in FIG. 3, the sensitive volumes 316 and 317 do not penetrate the smaller borehole 314, and the minimum depth of investigation (left-most point of the volumes) is too small to target NMR signals from the sensitive volumes 316 and 317. For example, the part of the sensitive volumes 316 and 317 on the back side (to the left in the drawing) of the NMR logging tool 302 are prone to washouts and other irregularities of the borehole. Thus, the NMR logging tool 302 can operate in a look-aside mode, rather than boosting the NMR signal from part of the sensitive volumes 316 and 317 on the back side of the NMR logging tool 302.

In the example shown in FIG. 3, the other sensitive volumes 318, 319, and 320 (corresponding to lower frequencies) are deeper, and the look-around mode of operation can be used in the smaller borehole 314 to acquire NMR data from the subterranean region in all radial directions for these sensitive volumes. As shown in FIG. 3, the shallower volumes of investigation have effective excitation arc angles that are less than 180° (shown as bold solid lines with the dashed line continuation representing potential excitation volume). In the case of the larger borehole 315, all the volumes may have an undesired signal coming from the borehole, and the spoiler may be used for some or all of the sensitive volumes in the larger borehole 315. For example, de-activating the second antenna may not be sufficient to spoil the undesired signals in some cases.

In some cases, the operating frequency of the NMR logging tool is changed periodically when running the NMR logging tool in a well. This may provide advantages in some cases. For example, a repetitive NMR experiment at a particular frequency may require some waiting time between the experiments for the nuclear magnetization to recover, and in such cases, the next experiment at the same sensitive volume (same frequency) cannot be started as quickly. The waiting time can be reduced or eliminated by switching to another frequency and therefore another sensitive volume (such as, for example, one of the the multiple sensitive volumes shown in FIGS. 3 and 4B) while waiting for recovery in the first region. This may also increase signal-to-noise ratio per unit time in some instances. As another example, changing frequency typically changes the radius of the sensitive region and therefore changes the depth of investigation, which may provide additional information about the formation properties.

Figure 4A:
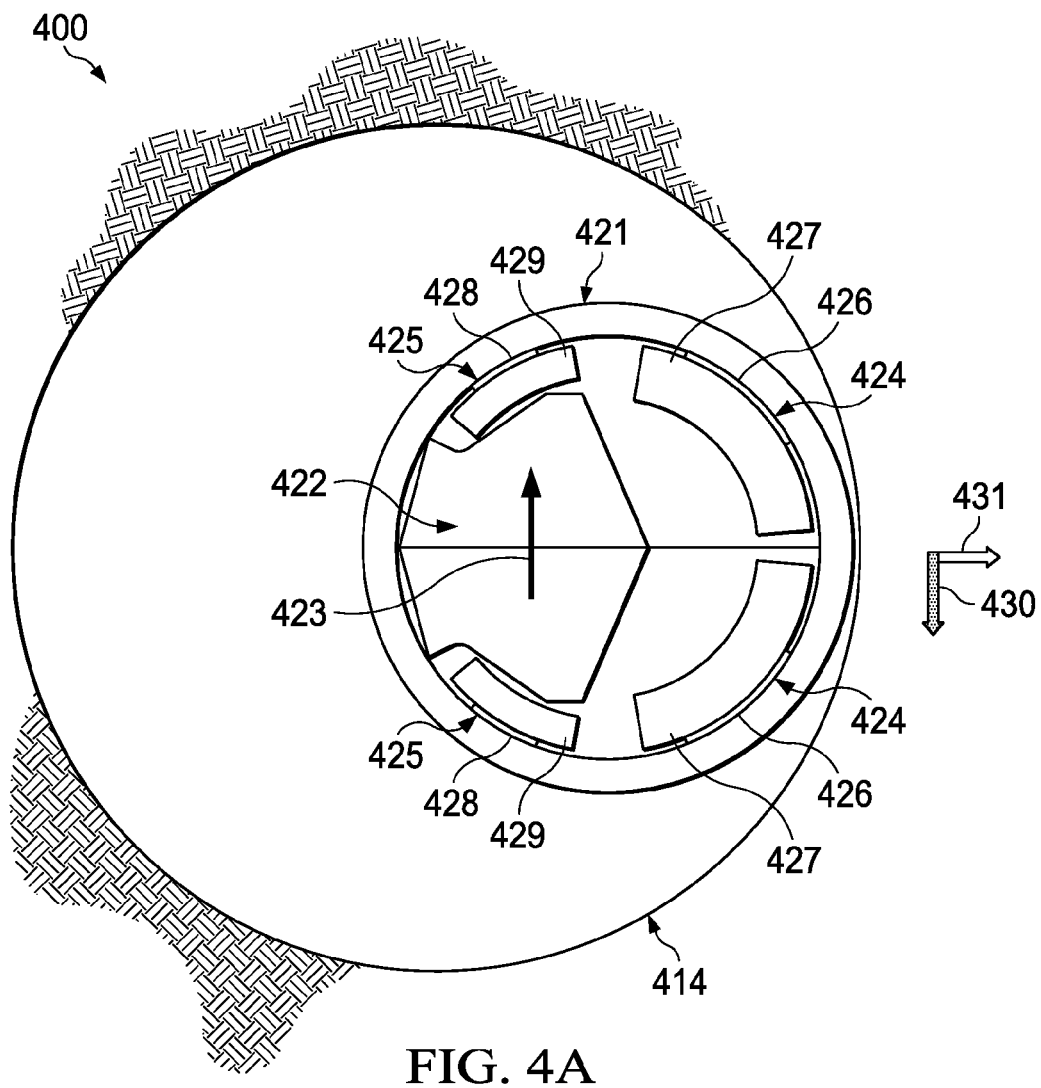
FIG. 4A is a diagram of an example NMR logging tool in a subterranean region.

FIG. 4A is a diagram of an example NMR logging tool 421 in a subterranean region 400. FIG. 4A shows a cross-sectional view of the NMR logging tool 421 in an example borehole 414. In some instances, the longitudinal length of the NMR logging tool (in the direction perpendicular to the plane of the drawing) is much greater than the cross-sectional dimensions, and the NMR logging tool can be modeled as a two-dimensional configuration.

The NMR logging tool 421 shown in FIG. 4A is one example of a sensor design that can be operated in both look-aside and look-around modes. In some cases, the example NMR logging tools 102 and 202 (of FIGS. 1A and 2A, respectively) can have the configuration shown in FIG. 4A, or the example NMR logging tools 102 and 202 can have another configuration. An example of a side-looking sensor design is shown in U.S. Pat. No. 6,452,388.

In the example shown in FIG. 4A, the NMR logging tool 421 includes a principal magnet system 422 that generates the principal, static magnetic field. The example NMR logging tool 421 has an antenna system that includes a first antenna assembly 424 and a second antenna assembly 425. The first antenna assembly 424 includes a first antenna 426 and a first soft magnetic core 427 made of a non-conductive material. The second antenna assembly 425 includes a second antenna 428 and a second soft magnetic core 429. In the example antenna system shown in FIG. 4A, the soft magnetic cores can be used to increase efficiency of the antenna coils.

In FIG. 4A, the direction of magnetization of the principal magnet system is shown at 423, and the direction of the principal, static magnetic field in an example location in the region of interest is shown at 430. The direction of the radio-frequency (RF) magnetic field is shown at 431. As shown at 430 and 431, in the region of interest, the principal magnetic field is perpendicular to the RF magnetic field. In particular, the principal magnetic field at the front region of NMR logging tool 421 (looking into the formation) has a circumferential orientation; and the RF magnetic field at the front region of NMR logging tool 421 has a perpendicular, radial orientation.

In the example shown, the static magnetic field on the back of the NMR logging tool 421 has the same direction as the static magnetic field on the front (illustrated at 430). The second antenna 428 can be connected to the first antenna 426 in either a booster mode or a spoiler mode, or the second antenna 428 can be disconnected from the first antenna 426 in an inactive mode. If the second antenna 428 is connected in a booster mode, the RF magnetic field on the back of the tool can have the same direction and substantially the same magnitude as the RF magnetic field on the front side of the tool (illustrated at 431). In another mode, the RF magnetic field on the back of the tool can have almost zero magnitude of either the same or opposite direction RF magnetic field.

Figure 4B:
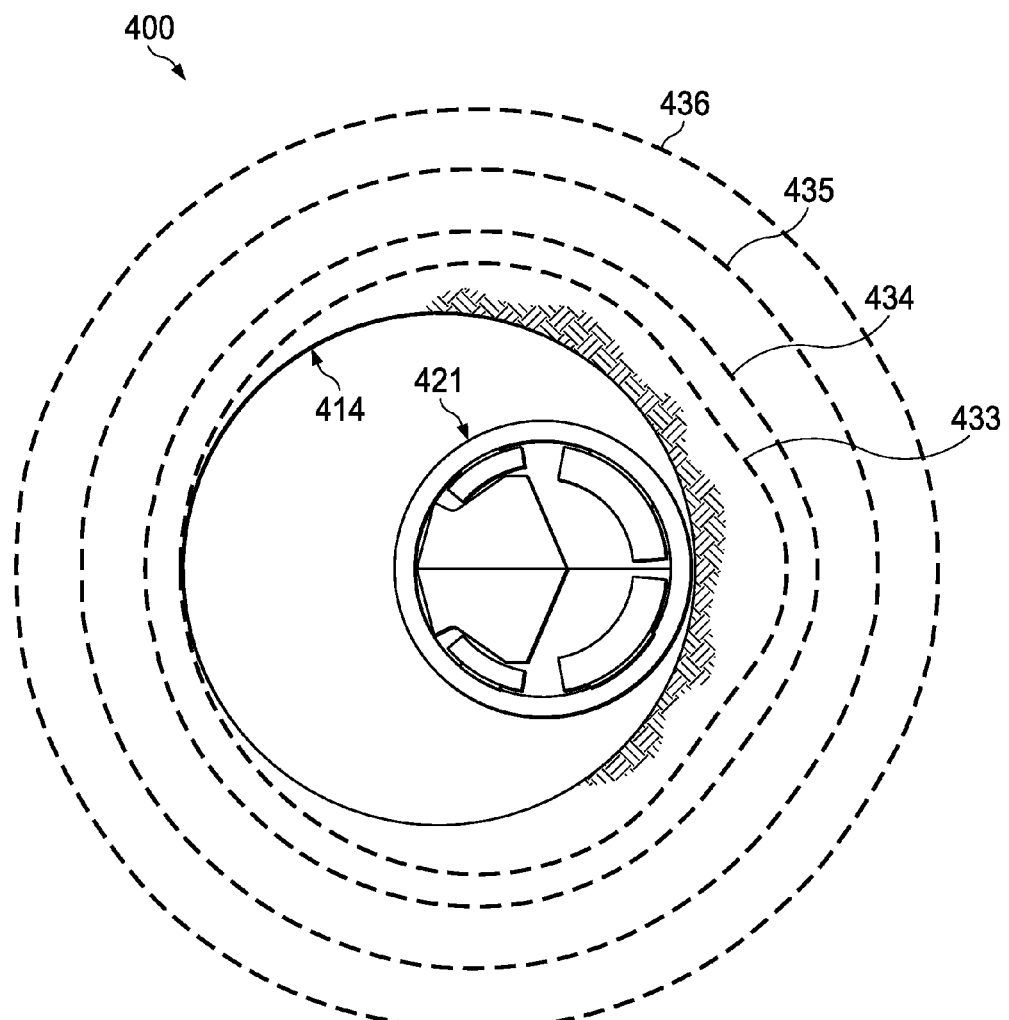
FIG. 4B is a diagram showing aspects of a magnetic field generated by a simulation of the example NMR logging tool in FIG. 4A.

FIG. 4B is a diagram showing aspects of magnetic fields generated by a simulation of the example NMR logging tool 421 in FIG. 4A. In FIG. 4B, the magnetic field is shown by the isolines 433, 434, 435, and 436 computed by numerical modeling. The example isolines 433, 434, 435, and 436 shown in FIG. 4B correspond to operating frequencies of 1.3 MHz, 1.05 MHz, 0.73 MHz and 0.55 MHz, respectively. As shown in the example simulation illustrated in FIG. 4B, the isolines do not penetrate the wall of the smaller (8.5-inch diameter) borehole 414.

Table 1 presents example numerical modeling results for the borehole signal received by the radio-frequency antenna of the example NMR logging tool 421 in a 12.5" borehole for two example cases. The first row of the table (labeled "no spoiler") shows the example results for the second antenna in an inactive mode, not connected to the first antenna. The second row of the table (labeled "with spoiler") shows the example results for the second antenna in an active mode, connected as a spoiler. The entries in each column show the amount of NMR signal (in porosity units, p.u.) received from fluid in the borehole, which is typically considered undesirable signal. In the example shown, the porosity units indicate the percentage of the total NMR signal compared to the total NMR signal that would be produced by the earth formation if it had 100% porosity (i.e. pure water). In some instances, an acceptable level is any value less than 1 p.u. The results are shown for operating frequencies of 1.3 MHz, 1.05 MHz, 0.73 MHz and 0.55 MHz in the respective columns.

|  | f1 = 1.3 MHz | f2 = 1.05 MHz | f3 = 0.73 MHz | f3 = 0.55 MHz |
| --- | --- | --- | --- | --- |
| No spoiler | 4.2 | 6.5 | 7.8 | 6.6 |
| With spoiler | 0.8 | 0.5 | 0.3 | 0.4 |

In this example, in the "no spoiler" mode the undesired borehole signal may be considered unacceptably high, while in the spoiler mode the signal is small enough to be acceptable. The results presented in Table 1 show an example instance where the second antenna provides an advantage in the spoiler mode, for example, as compared to the booster mode and the inactive mode.

FIG. 5 is a diagram showing example electronic circuitry for an NMR logging tool 500. The example NMR logging tool 500 includes an antenna system 502, a transmitter driver 510, a transmitter/receiver decoupler 520, and a receiver 530. The example antenna system 502 includes a switching system 504, radio-frequency (RF) antennas 540, and other features. The example switching system 504 can switch the RF antennas 540 between multiple different modes of operation. The transmitter driver 510 can operate as the example transmitter 206 shown in FIG. 2, and the receiver 530 can operate as the example receiver 210 shown in FIG. 2. The transmitter/receiver decoupler 520 can isolate the internal electronics of the receiver 530 from the other electronics of the NMR logging tool 500, for example, to protect the receiver electronics when the NMR logging tool 500 is not actively acquiring NMR data.

In FIG. 5, the example electric circuitry includes first and second antennas (shown as inductors $L_1$, $L_2$), dummy inductors (shown as $L_{D1}$, $L_{D2}$), tuning capacitors (shown as $C_1$-$C_N$), and multiple switches (shown as 511, 512, 513, and 515). The switches 511, 512, 513, 514, and 515 can be implemented, for example, as relays or other types of switching devices. In some examples, the antennas $L_1$, $L_2$ are located in a sensor section of the NMR logging tool while the dummy inductors $L_{D1}$, $L_{D2}$ are located in the electronics section. One or more switches 515 for the tuning capacitors $C_1$-$C_N$ can be used to tune the circuit to different resonance frequencies for multi-frequency operation of the NMR logging tool 500. The dummy inductors can be used, for example, to ensure that the total inductance of the antenna system 502 (as seen by the transmitter driver 510 and the receiver 530) remains unchanged when switching between different modes of the antenna system operation. In some instances, this enables using the same set of the tuning capacitors in each mode.

In the example shown in FIG. 5, the switches 511, 512, 513, and 514 form a switching system 504 that controls the operating mode of the second antenna $L_2$. Each individual switch has two or more possible states. The switch 511 has two states: it can be connected at a first terminal 521 or connected at a second terminal 522. Changing the switch 511 between the two terminals 521, 522 changes the phase of the current through the second antenna $L_2$ with respect to the first antenna $L_1$. When the switch 511 is connected at the first terminal 521, the first and second antennas are in phase and can generate dipole fields having the same orientation; when the switch 511 is connected at the second terminal 522, the first and second antennas are 180 degrees out of phase and can generate dipole fields having opposite orientations. The other switches 511, 512, and 513 each have two states: disconnected ("off") and connected ("on").

The switching system 504 can have multiple distinct configurations for the distinct operating modes of the antenna system 502. Example configurations of the switches 511, 512, 513, and 514 are shown in Table 2. Each row corresponds to a different mode of operation of the second antenna $L_2$ of the antenna system 502, and each column corresponds to a different switch.

TABLE 2

|  | 511 | 512 | 513 | 514 |
|---|---|---|---|---|
| Inactive mode | 522 | on | on | off |
| Spoiler mode | 522 | on | off | on |
| Booster mode | 521 | off | on | off |

The first row shows the switching system configuration for the inactive mode of the second antenna $L_2$, which corresponds to operating the NMR logging tool 500 in a look-aside mode without a spoiler. The second row shows the switching system configuration for the active, spoiler mode of the second antenna $L_2$, which corresponds to operating the NMR logging tool 500 in a look-aside mode with a spoiler. The third row shows the switching system configuration for the active, booster mode of the second antenna $L_2$, which corresponds to operating the NMR logging tool 500 in a look-around mode with a booster.

In the example shown, the first and second antenna have equal inductance L and negligible mutual coupling. In such instances, the total inductance of the antenna system 502 remains invariant with respect to switching between the different operating modes, for example, if the dummy inductors are selected to satisfy the equations $L_{D1}=L$ and $L_{D2}=2L$.

Table 3 shows example numerical modeling results for the total signal-to-noise ratio (SNR) for the example NMR logging tool 421 shown in FIG. 4A. The following parameters were used for the modeling: the modeled borehole had a diameter of 8.5 inches, the modeled RF antennas had a length of 12 inches, the refocusing RF pulse width was 45 μs, and 10 operating frequencies in the range 0.55-1.3 MHz were used. The system was modeled with two types of drilling mud: a water based mud (WBM) with resistivity 0.05 Ohm-m and an oil based mud (OBM) with infinite resistivity. In the example shown, five higher operating frequencies were modeled in a "no spoiler" mode to avoid too-shallow readings. Five other (lower) frequencies were modeled with the second antenna in a "booster" mode (corresponding to the tool operating in the look-around mode).

TABLE 3

|  |  | SNR | $(P_{pulse})_{max}$, W | $P_{dc}$, W |
|---|---|---|---|---|
| OBM | Permanent Spoiler | 60.8 | 5788 | 502 |
|  | Switchable Spoiler/Booster | 91.3 | 7168 | 651 |
| WBM | Permanent Spoiler | 44.9 | 9348 | 899 |
|  | Switchable Spoiler/Booster | 49.8 | 9960 | 1034 |

The results in Table 3 show an example of signal-to-noise benefits for a switchable antenna system compared, for example, to a permanently connected antenna operated only in a spoiler mode. Also shown in the Table 3 are the maximum peak power (at the lowest frequency) and the DC power consumption for each antenna system operating mode.

Some subject matter and operations described in this specification can be implemented in digital electronic circuitry, or in computer software, firmware, or hardware, including the structures disclosed in this specification and their structural equivalents, or in combinations of one or more of them. Some subject matter described in this specification can be implemented as one or more programs encoded in a digital electronic controller, a microprocessor, or another type of data processing apparatus.

The term "data processing apparatus" encompasses all kinds of apparatus, devices, and machines for processing data, including by way of example a processor, a controller, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A program can be written or encoded in any form of programming language. Some of the processes and logic flows described in this specification can be performed by one or more programmable processors executing one or more programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit). Processors suitable for the execution of a program include, by way of example, both general and special purpose microprocessors, digital electronic controllers, etc.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of examples have been described. Nevertheless, it will be understood that various modifications can be made. Accordingly, other implementations are within the scope of the following claims.

What is claimed is:

1. A nuclear magnetic resonance (NMR) logging method for obtaining NMR data from a subterranean region, the method comprising:
generating a first radio-frequency (RF) magnetic field by operation of an antenna system of an NMR logging tool disposed in a borehole in a subterranean region, the antenna system comprising a first antenna and a second antenna, the second antenna being switchable between a plurality of operating modes comprising a booster mode, a spoiler mode, and an inactive mode, the first RF magnetic field being generated by operation of the antenna system having the second antenna in a first one of the plurality of operating modes;
changing the second antenna of the NMR logging tool from the first operating mode to a second one of the plurality of operating modes while the NMR logging tool is disposed in the borehole; and
generating a second RF magnetic field by operation of the antenna system having the second antenna in the second operating mode.

2. The NMR logging method of claim 1, wherein changing the second antenna of the NMR logging tool from the first operating mode to the second operating mode comprises:
changing the second antenna from the booster mode to the inactive mode while the NMR logging tool is disposed in the borehole; or
changing the second antenna from the inactive mode to the booster mode while the NMR logging tool is disposed in the borehole.

3. The NMR logging method of claim 1, wherein changing the second antenna of the NMR logging tool from the first operating mode to the second operating mode comprises:
changing the second antenna from the booster mode to the spoiler mode while the NMR logging tool is disposed in the borehole; or
changing the second antenna from the spoiler mode to the booster mode while the NMR logging tool is disposed in the borehole.

4. The NMR logging method of claim 1, wherein changing the second antenna of the NMR logging tool from the first operating mode to the second operating mode comprises:
changing the second antenna from the inactive mode to the spoiler mode while the NMR logging tool is disposed in the borehole; or
changing the second antenna from the spoiler mode to the inactive mode while the NMR logging tool is disposed in the borehole.

5. The NMR logging method of claim 1, wherein the first antenna is configured to produce a first RF magnetic dipole field having a first orientation, and the second antenna in the spoiler mode is configured to produce a second RF magnetic dipole field having a second orientation opposite the first orientation.

6. The NMR logging method of claim 1, wherein the first antenna is configured to produce a first RF magnetic dipole field having a first orientation, and the second antenna in the booster mode is configured to produce a second RF magnetic dipole field having the same, first orientation.

7. The NMR logging method of claim 1, wherein the first antenna is configured to produce a first RF magnetic dipole field, and the second antenna in the inactive mode is configured to produce substantially no RF magnetic field during operation of the antenna system.

8. The NMR logging method of claim 1, wherein changing the second antenna comprises manipulating one or more switches of a switching system of the NMR logging tool.

9. The NMR logging method of claim 1, wherein changing the second antenna of the NMR logging tool from the first operating mode to the second operating mode comprises:
changing the NMR logging tool from a look-aside mode to a look-around mode while the NMR logging tool is disposed in the borehole; or
changing the NMR logging tool from the look-around mode to the look-aside mode while the NMR logging tool is disposed in the borehole.

10. The NMR logging method of claim 1, further comprising acquiring an NMR signal from the subterranean region.

11. The NMR logging method of claim 1, wherein the first RF magnetic field is generated while the NMR logging tool is disposed at a first logging point in the borehole, and the second RF magnetic field is generated while the NMR logging tool is disposed at a second, different logging point in the borehole.

12. The NMR logging method of claim 1, wherein the first RF magnetic field and the second RF magnetic field are generated while the NMR logging tool is disposed at a common logging point in the borehole.

13. The NMR logging method of claim 1, wherein the first RF magnetic field comprises a first frequency associated with a first depth of investigation, the second RF magnetic field comprises a second frequency associated with a second, different depth of investigation, and changing the second antenna comprises configuring NMR logging tool for the second depth of investigation.

14. A nuclear magnetic resonance (NMR) logging method for obtaining NMR data from a subterranean region, the method comprising:
operating an NMR logging tool in a look-aside mode while the NMR logging tool is disposed in a borehole in a subterranean region, the NMR logging tool in the look-aside mode adapted to detect a substantially higher proportion of NMR signal from a first radial direction than a second, opposite radial direction;
operating the NMR logging tool in a look-around mode of operation while the NMR logging tool is disposed in the borehole in the subterranean region, the NMR logging tool in the look-around mode adapted to detect substantially equal proportions of NMR signal from the first and second radial directions; and
changing the NMR logging tool between the look-aside mode and the look-around mode while the NMR logging tool is disposed in the borehole in the subterranean region.

15. The NMR logging method of claim 14, comprising:
acquiring look-aside NMR data by operation of the NMR logging tool in the look-aside mode;
acquiring look-around NMR data by operation of the NMR logging tool in the look-around mode; and
comparing the look-aside NMR data with the look-around NMR data.

16. The NMR logging method of claim 14, wherein:
the NMR logging tool comprises an antenna system comprising a first antenna and a second antenna, the second antenna being switchable between a plurality of operating modes comprising at least two of a booster mode, a spoiler mode, and an inactive mode;

operating the NMR logging tool in the look-aside mode comprises operating the antenna system with the second antenna in the spoiler mode or the inactive mode; and operating the NMR logging tool in the look-around mode comprises operating the antenna system with the second antenna in the booster mode.

17. The NMR logging method of claim 14, wherein:

operating the NMR logging tool in the look-aside mode comprises operating the NMR logging tool while an outer boundary of the NMR logging tool contacts an inner wall of the borehole;

operating the NMR logging tool in the look-aside mode comprises operating the NMR logging tool while the NMR is substantially radially centered in the borehole; and changing the NMR logging tool between the look-aside mode and the look-around mode comprises shifting a position of the NMR logging tool radially within the borehole.

18. A nuclear magnetic resonance (NMR) logging tool for downhole use in a borehole in a subterranean region, the NMR logging tool comprising:

a magnet assembly operable to produce a static magnetic field;

an antenna system comprising:
 a first antenna; and
 a second antenna; and
 a switching system that is switchable between at least three configurations comprising:
  a spoiler configuration in which the first antenna and the second antenna are active and configured to produce respective radio-frequency (RF) magnetic dipole fields having opposite orientations;
  a booster configuration in which the first antenna and the second antenna are active and configured to produce respective RF magnetic dipole fields having a common orientation; and
  a third configuration in which the first antenna is active and the second antenna is inactive.

19. A drill string assembly comprising the NMR logging tool of claim 18.

20. A wireline logging assembly comprising the NMR logging tool of claim 18.

* * * * *